US005535949A

United States Patent [19]
Boisture

[11] Patent Number: 5,535,949
[45] Date of Patent: Jul. 16, 1996

[54] SAFETY SWITCH SYSTEM FOR HYDROBLASTING OPERATIONS

[75] Inventor: Thomas B. Boisture, Baytown, Tex.

[73] Assignee: C. H. Heist Corp., Baytown, Tex.

[21] Appl. No.: 450,795

[22] Filed: May 25, 1995

[51] Int. Cl.$^6$ ..................................................... B05B 11/00
[52] U.S. Cl. ............................................. 239/124; 251/57
[58] Field of Search ................................. 234/124, 126, 234/DIG. 22; 251/57, 31; 137/637

[56] References Cited

U.S. PATENT DOCUMENTS

| | | | |
|---|---|---|---|
| 2,246,348 | 6/1941 | Coffey | 251/57 |
| 2,376,019 | 5/1945 | Thomas | 251/60 X |
| 3,045,690 | 7/1962 | Nickellis | 251/570 X |
| 3,762,575 | 6/1972 | Hinrichs . | |
| 3,885,739 | 5/1975 | Tuttle . | |
| 4,216,911 | 8/1980 | Huperz et al. . | |
| 4,784,330 | 11/1988 | Hammelmann . | |
| 4,802,313 | 2/1989 | Smith . | |
| 5,199,642 | 4/1993 | Rawkin | 239/124 |
| 5,238,191 | 8/1993 | Gaymon . | |
| 5,297,777 | 3/1994 | Yie . | |
| 5,349,982 | 9/1994 | Goldsmith | 239/124 X |

OTHER PUBLICATIONS

Heist 10M Double Deadman Control Assembly Drawings (8 pages) dated Circa 1990–1991.

Primary Examiner—Kevin P. Weldon
Attorney, Agent, or Firm—Pravel, Hewitt, Kimball & Krieger

[57] ABSTRACT

An improved safety switch system for hydroblasting and hydrocutting operations. The switch system comprises at least two actuatable triggers each displacing a specified volume of incompressible fluid which, when coupled with a predetermined volume within an actuator, displaces a piston initiating a signal. In specific application within a hydroblasting gun, two separate triggers are depressed displacing a predetermined volume in an actuator adjacent a dump valve. Until the actuator fully closes the dump valve, hydroblasting operations may not begin. In this manner, the chances of accidental discharge through the depression of a single trigger are eliminated and preferred ergonomical characteristics are provided.

14 Claims, 5 Drawing Sheets

SAFETY SWITCH SYSTEM FOR HYDROBLASTING OPERATIONS

BACKGROUND OF THE INVENTION

1. Field of the Invention

This invention relates to a safety switch system. More specifically, this invention relates to an improved safety switch system for use in hydroblasting and hydrocutting operations.

2. Description of the Prior Art

High pressure water is used for a number of purposes. For example, in the more traditional applications of hydroblasting operations, it is used to clean industrial and commercial equipment such as heat exchangers in refineries, concrete pads and runways, and other commercial applications. In performing these cleaning operations, it is not uncommon to eject water at pressures on the order of 6,000–20,000 psi. Furthermore, water is used in hydrocutting operations to cut metal, glass and other materials. When performing these operations, water is typically pumped and ejected at pressures on the order of 30,000–40,000 psi.

In either event, pressures at these levels can cause serious injury to an operator. Therefore, there is a need in the industry to improve the safety of hydroblasting and hydrocutting equipment used in close proximity to the operator.

The prior art discloses a number of safety mechanisms used on hydroblasting guns. Such prior art systems typically comprise the use of a mechanical lever or an electric switch in combination with a trigger. See, for example, U.S. Pat. Nos. 3,885,739; 4,216,911; and 4,802,313. U.S. Pat. Nos. 4,216,911 and 4,802,313 disclose the use of a mechanical lever which must be depressed to make a trigger operable. U.S. Pat. No. 3,885,739 discloses the use of an electric switch which must be engaged to make the trigger operable. However, these prior art devices can be tiresome to continuously operate and are not ergonomically designed. This can lead to early fatigue which can cause accidents.

Therefore, the need exists in the industry for an improved system which is easy and comfortable to activate for prolonged periods of time without undue fatigue.

SUMMARY OF THE INVENTION

The invention comprises a switch system having a first trigger supported within a housing. A displacable ram is supported within the housing and a lever is in spaced relationship to the ram. Upon rotation or pivotal movement of the lever, the ram displaces a predetermined first volume of fluid within the housing.

The switch system includes a second trigger also having a separate housing and a displacable ram supported within that housing. The second trigger also includes a lever which is in spaced relationship to the ram of the second trigger so that upon rotation or pivotal movement of the second lever, the ram within the housing of the second actuator trigger displaces a predetermined second volume of incompressible fluid within the housing of the second trigger.

The system also includes an actuator having a housing and a displacable piston supported within the actuator housing. The actuator housing is in fluid communication with the volumes of incompressible fluid displaced by the rams of the first and second triggers. A piston is supported within the actuator housing and is thereby displaced a predetermined third volume which is at least greater than either the first volume or the second volume so that upon displacement of the piston within the actuator housing by said predetermined third volume, a signal is generated.

Within a hydroblasting operation, the switch system described above would be mounted in a gun having a base member. The gun includes a dump valve housing having a sealing piston biased to an open position and adapted to be contacted by the piston supported within the actuator housing. In this manner, upon displacement of the piston within the actuator housing by the predetermined third volume, the actuator piston contacts the biased piston within the dump valve housing and begins to displace the biased piston enabling the actuation of the gun. In an alternate embodiment of the switch system as used in a hydroblasting gun, the piston within the actuator housing may be an integral part of the biased piston within the dump valve, thereby still enabling the displacement of the biased piston for actuation of the gun.

In the preferred embodiment, the third volume of displaced fluid is greater than either the first volume or the second volume of displaced fluid so that upon displacement of the piston within the actuator housing a volume equal to either the first volume or the second volume, the biased piston within the actuator housing is initially contacted and then further displacement of the biased piston within the actuator housing serves to act as a throttle gradually closing the biased piston and providing additional hydroblasting force.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF PREFERRED EMBODIMENT

Figure 1:
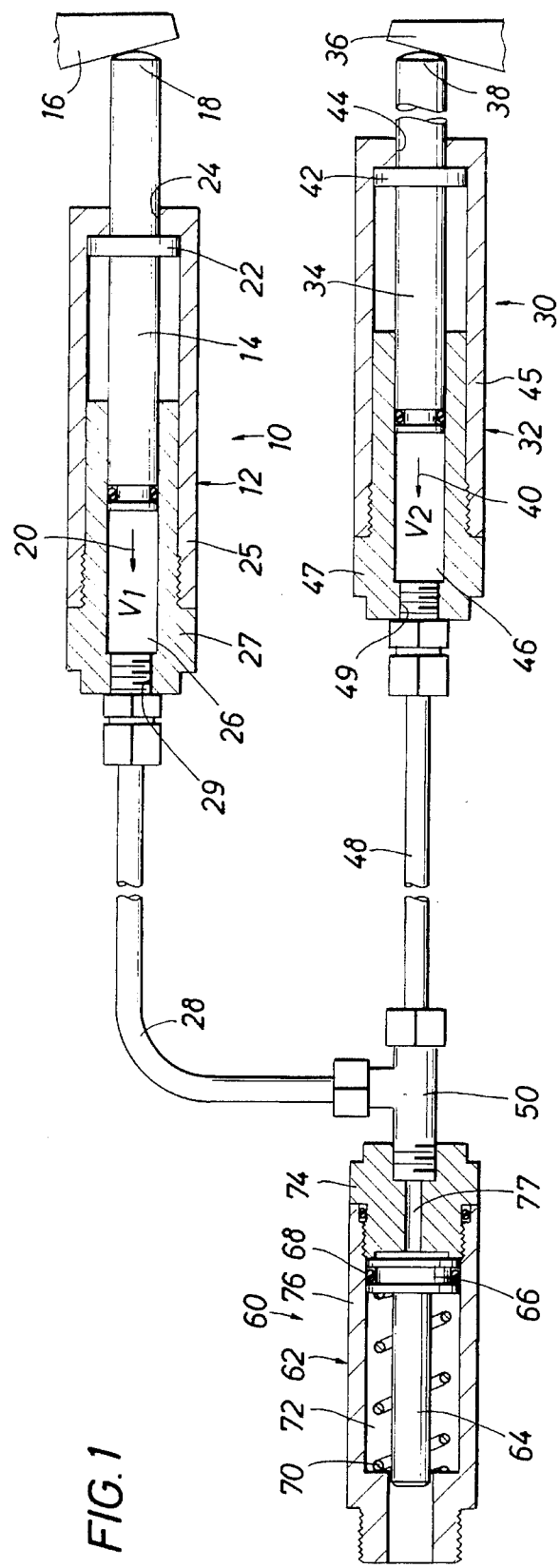
FIG. 1 is a schematic of the present invention with no triggers displaced.

Referring to FIG. 1, a first actuatable trigger 10 is shown having a housing 12 and a displacable ram 14 supported therein. Housing 12 includes an end cap 27 which is threadably engaged onto a cylindrical portion 25 of housing 12. Ram 14 is in contact with a lever 16 adapted to depress one end 18 of ram 14 and thereby move ram 14 in the direction of arrow 20. Ram 16 may include a lip portion 22 adapted to engage one end of housing 12 thereby prohibiting the further displacement of ram 14 to the right as shown in FIG. 1 through aperture 24 of housing 12. Preferably, the volume $V_1$ within space 26 of housing 12 is filled with an incompressible fluid, such as hydraulic fluid.

The present invention also includes a second actuatable trigger 30 virtually identical in structure and operation to first trigger 10. That is, it also includes a housing 32 having a ram 34 supported therein. One end 38 of ram 34 is in contact with a lever 36. Housing 32 also includes a cap portion 47 which is threadably engaged onto a cylindrical portion 45 of housing 32. Thus, upon pivotal movement of lever 36 to the left as shown in FIG. 1, ram 34 would be displaced in the direction of arrow 40. Ram 34 may also include a lip portion 42 which further prevents the movement of ram 34 to the right as shown in FIG. 1 through aperture 44 of housing 32. As in the case of the first actuatable trigger 10, the volume $V_2$ of space 46 within housing 32 is preferably filled with an incompressible fluid, such as hydraulic fluid.

Referring still to FIG. 1, a hollow conduit 28 is threadably engaged to one end 29 of housing 12. Similarly, a hollow conduit 48 is threadably engaged to one end 49 of housing 32. The other end of each conduit 28 and 48 is in fluid communication with one another through a T-section 50.

The present invention also includes an actuator 60 having a housing 62 and a piston 64 supported therein. Piston 64 includes a head portion 66 having an O-ring 68 which serves to provide a seal between either side of head 66. Actuator 60 includes a spring 70 supported within space 72 of housing 62. Spring 70 serves to bias piston 64 to the right of housing 62 as shown in FIG. 1. Housing 62 includes a cap section 74 which is threadably engaged to the cylindrical portion 76 of housing 62. Cap section 74 includes a through bore 77. T-section 50 is threadably attached to cap section 74 at base 77. Thus, space 26 of housing 12 and space 46 of housing 32 are in fluid communication through T-section 50 with head 66 within housing 62.

Figure 2:
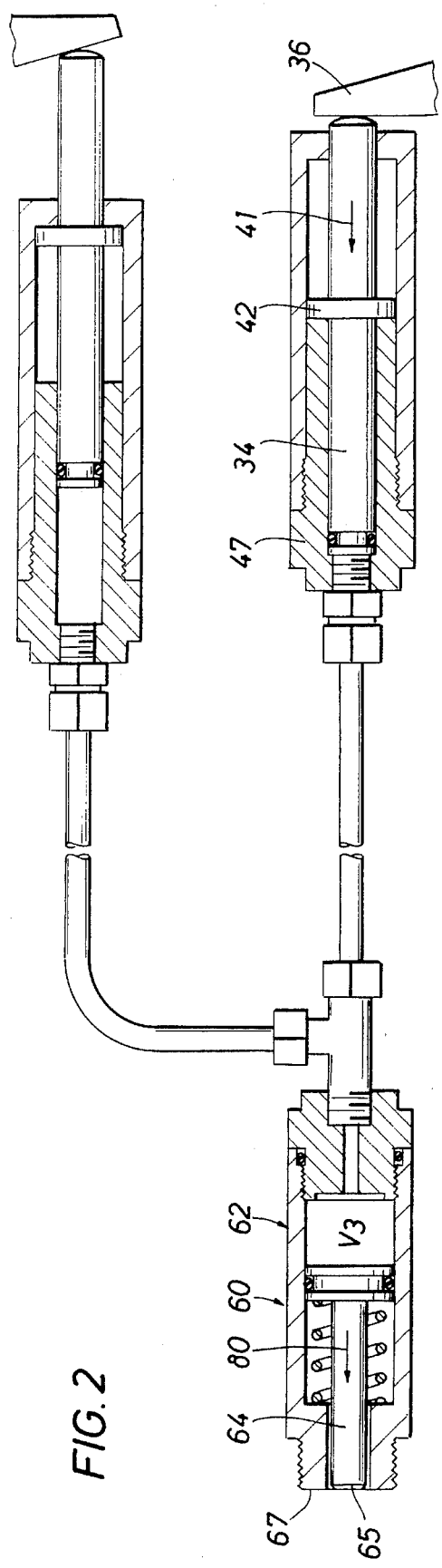
FIG. 2 is a schematic of the present invention with one trigger depressed.
Figure 3:
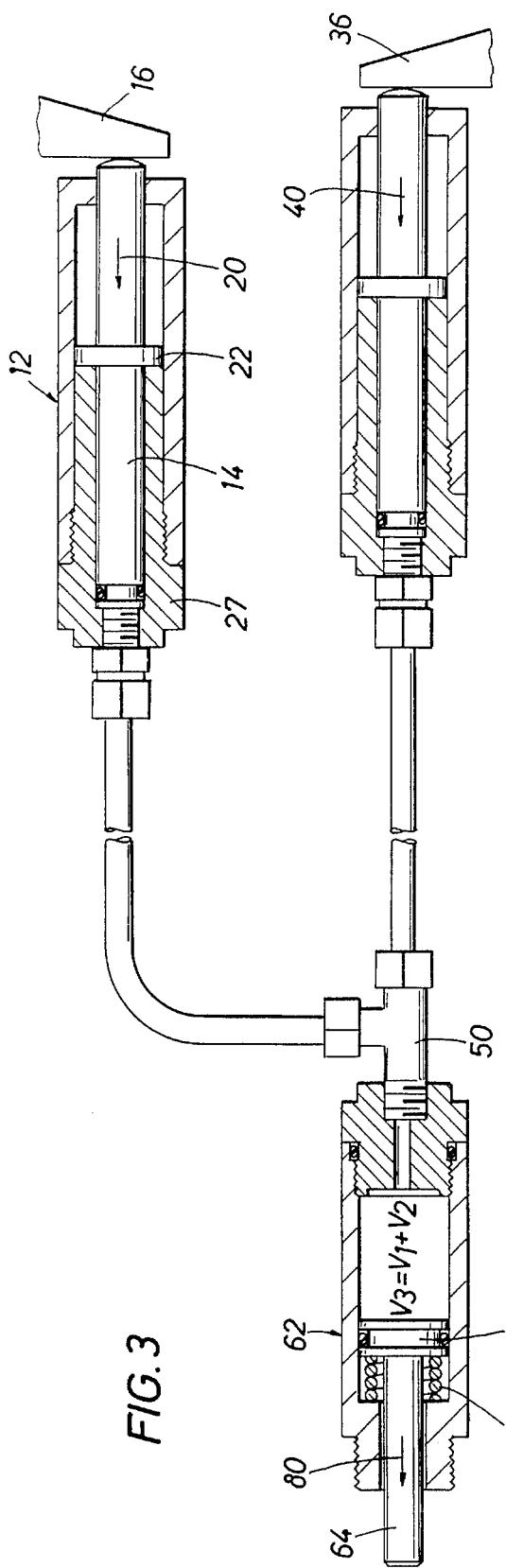
FIG. 3 is a schematic of the present invention with both triggers depressed.

Referring now to FIGS. 2 and 3, the operation of the present invention is further illustrated. In FIG. 2, lever 36 has been pivoted to the left displacing ram 34 in the direction of arrow 41. As shown, ram 34 has been fully displaced to the left enabling lip portion 42 to contact cap portion 47 of housing 32. Therefore, as shown, upon full displacement of ram 34 to the left in the direction of arrow 41, the volume $V_2$ of hydraulic fluid has been displaced out of housing 32. Thus, as shown, displaced volume $V_2$ (see FIG. 1) is equivalent to volume $V_3$ of actuator 60 as shown in FIG. 2, since the incompressible fluid which previously occupied volume $V_2$ has been displaced to volume $V_3$. The length of piston 64 is selected so that upon displacement of piston 64 equivalent to volume $V_3$ as shown in FIG. 2, the tip 65 of piston 64 is at or slightly beyond the edge 67 of housing 62.

Referring now to FIG. 3, first lever 16 is shown having fully displaced ram 14 until lip 22 engages cap 27 of housing 12. At this point, the volume $V_1$ of incompressible fluid has been displaced out of housing 12. That fluid has been introduced into volume $V_3$ of housing 62. Therefore, as shown in FIG. 3 with both the first and second triggers fully depressed, the maximum displacement permitted is $V_3=V_1+V_2$. In this final position, spring 70 is fully compressed and piston 64 has been fully extended to the left in the direction of arrow 80.

In FIG. 2, piston 64 has been displaced to the point it begins to exit past edge 67 of housing 62 and a signal is capable of being generated at that point based on the further extension of piston 64 to the left in the direction of arrow 80 until piston 64 is fully extended as shown in FIG. 3. As further described below, between the stages shown in FIG. 2 (when a signal is first generated by piston 64) and FIG. 3 (when the maximum displacement of piston 64 has occurred), volume $V_3$ will gradually increase permitting the progressive extension of piston 64 from the position shown in FIG. 2 to the final position shown in FIG. 3. In this manner, a throttling step is provided. This same structure may be used in hydroblasting or hydrocutting operations.

Additionally, the ergonomics can be improved by adjusting the diameter of rams 14 and 34 compared to the diameter of head 66 of piston 64. Since an operator may have to hold levers 16 and 36 for several minutes at a time over a normal workday, it is preferable to provide a resistant load to the displacement of rams 14 and 34 which does not fatigue the operator. Accordingly, it is preferable that the diameters of rams 14 and 34 are smaller than the diameter of head 66. Preferably, the diameter of each ram 14 and 34 is between about 0.5 and 0.6 the diameter of head 66. Thus, the stroke distance of ram 14 required to create a volume $V_1$ is between about 4.0 and 2.777 times, respectively, the stroke distance required of piston head 66 to result in the same volume $V_3$ in actuator 60. In this manner, the trigger force required of an operator to displace lever 16 to result in a given displacement of head 66 is significantly less, and therefore more ergonomical. Additionally, due to the sensitivity of actuator 60 since displacement of piston 64 is significantly less than the displacement of either ram 14 or 34 based on this diametric relationship, actuator 60 can be adjusted to be particularly sensitive to displacements of each trigger. By the same token, the system is more forgiving of an operator's minor displacement of each ram 14 and 34 since minor displacements of the ram will result in virtually little or no displacement of head 66.

Figure 4:
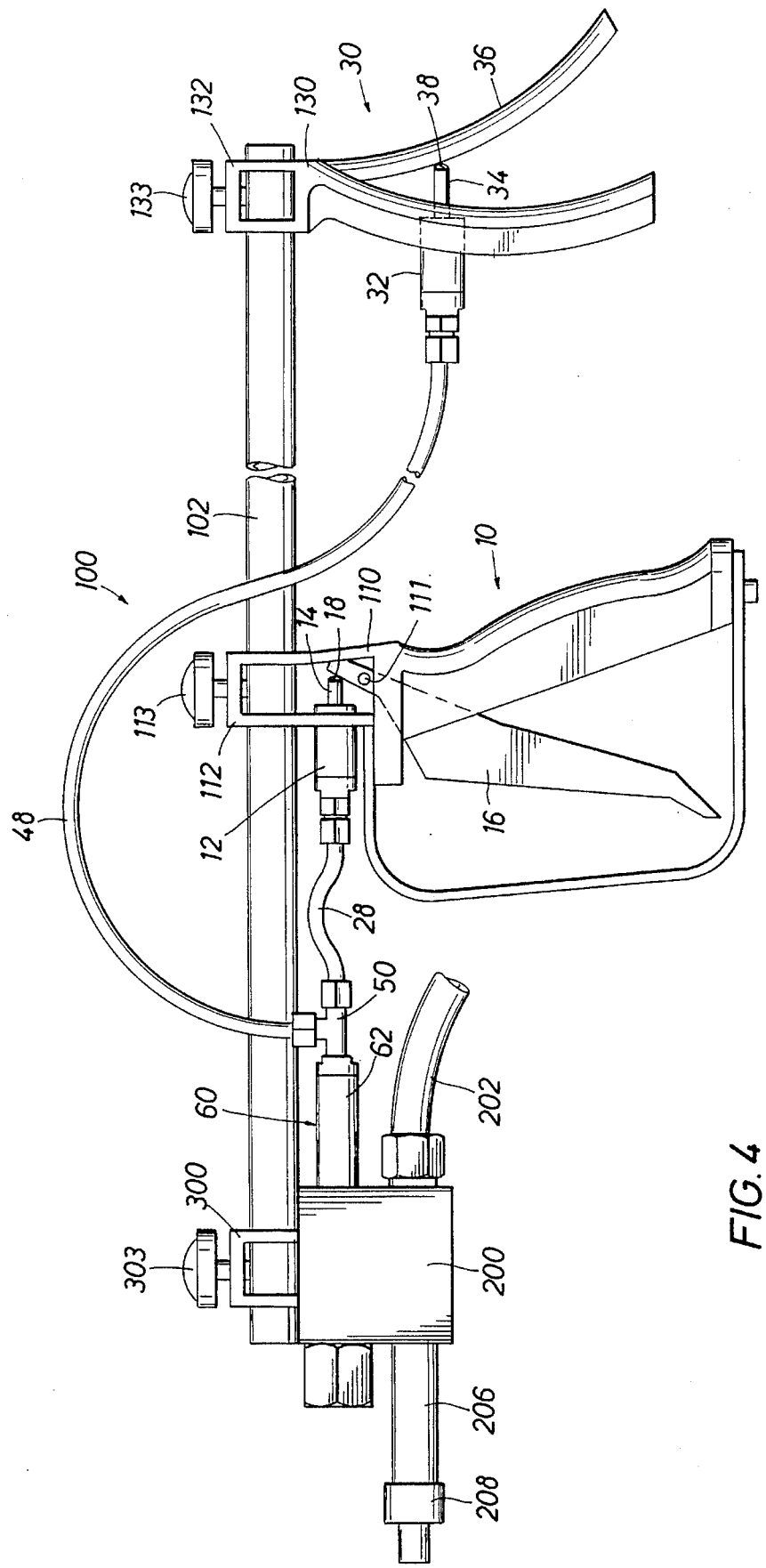
FIG. 4 is an elevation view of a hydroblasting gun according to the present invention.

Referring now to FIG. 4, the system of FIG. 1 is shown incorporated within a hydroblasting gun 100. Hydroblasting gun 100 includes a base longitudinal member 102 which is the principal support member of the gun. A first trigger 10 is shown having an adjustable frame 110 adapted to be attached to base member 102. Frame 110 includes an upper portion 112 having a threaded screw 113 which passes through the top of upper portion 112 and engages member 102. In this manner, frame 110 can be relocated along base member 102. Housing 12 of FIG. 1 is shown supported within frame 110. Lever 16 is pivotally attached at pivot point 111 to frame 110 and contacts end 18 of ram 14. Conduit 28 is shown exiting one end of housing 12 and engaging T-section 50.

Second trigger 30 also includes a frame structure 130 having an upper portion 132 which includes a threaded screw 133 that passes through upper portion 132 and is adapted to engage base member 102. As in the case of screw 113, screw 133 can also be loosened permitting the relocation of frame 130 relative to base member 102 and then screw 133 can be tightened securing its position. The repositioning of the first and second triggers 10 and 30 serve to further improve the ergonomics of the present invention for the particular operator.

Referring still to FIG. 4, lever 36 is shown pivotally connected within frame 130 and contacting end 38 of ram 34. Housing 32 is supported within frame 130. Conduit 48 is attached at one of housing 32 and at the other end to T-member 50 as discussed above with respect to FIG. 1. Conduits 28 and 48 include sufficient slack to enable the readjustment of frames 110 and 130 along base member 102.

Actuator 60 is shown in fluid communication with T-member 50 and secured to an adjustable dump valve 200.

Dump valve 200 includes an upper frame portion 300 having an adjustable screw 303 passing therethrough which permits the readjustment of dump valve 200 relative to base member 102.

Figure 6:
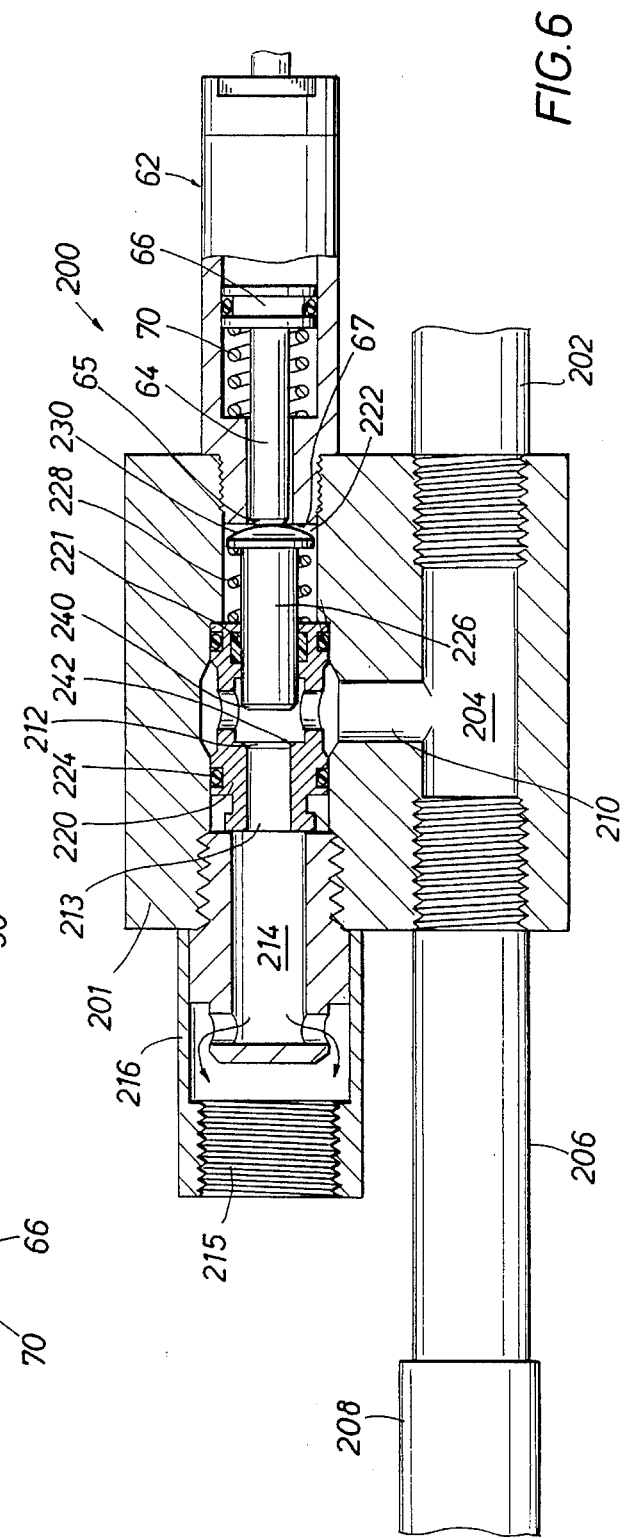
FIG. 6 is a cross-sectional detail of a portion of the present invention.

Referring to FIG. 6 and FIG. 4, the operation of dump valve 200 will be further discussed. Dump valve 200 includes a housing 201 shown in cross-section in FIG. 6. Housing 201 includes a bore 204 adapted to receive a conduit 202 through which water flows for the hydroblasting operation. A pipe 206 is threadably connected to the other end of bore 204. A nozzle 208 is attached at the other end of pipe 206. Housing 201 also includes a vertical bore 210 which passes through an elbow bore 212. A muffler 216 is threadably engaged to bore 212. Muffler 216 includes bores 214 and 215 for the flow of water to the atmosphere at a low pressure when dump valve 200 is biased open and gun 100 is in a non-operational mode.

Referring still to FIG. 6, a cylindrical sleeve 220 is supported within a bore 222 which is in fluid communication with elbow bore 212. Sleeve 220 includes O-rings 224 which provide a sealed engagement with bore 222. A piston 226 is supported within sleeve 220 and is biased to an open position as shown in FIG. 6 by spring 228. Sleeve 220 includes bore 213 in fluid communication with bores 210, 212 and 214. Interior seal 221 mounted within sleeve 220 serves to provide a seal between piston 226 and sleeve 220. Spring 228 contacts head 230 of piston 226. In this manner, piston 226 is biased in an open position fully extended to the right as shown. When neither lever 16 or lever 36 is depressed, piston 64 is fully recessed within housing 62 (as shown in FIG. 1) and dump valve 200 is biased open. Once either the first or second lever 16/36 is fully depressed and piston 64 is advanced just past edge 67 of housing 62 as shown in FIGS. 2 and 6, piston 64 contacts head 230 of piston 226. Thus, any further displacement of ram 14 by lever 16 (assuming ram 34 has already been fully displaced by lever 36) permits the gradual displacement of piston 64 to the left in the direction of arrow 80 (see FIG. 2). Therefore, since piston 64 is in contact in the head 230, piston 226 is thereby gradually displacing to the left until beveled edge 240 of piston 226 seals against beveled edge 242 of sleeve 220. At that point, a seal is made and dump valve 200 no longer permits the discharge of water through bores 214 and 215.

In the operation of the present invention, when neither lever 16 nor 36 is depressed and hydraulic gun 100 is idle, water passes through conduit 202 and exits through nozzle 208 and bores 210, 212, 213, 214 and 215. In this manner, there is a constant release of water (about 5–20 gallons per minute) at a low pressure due to the size of bores 214 and 215. This amount of fluid through these larger orifices presents no danger.

Once the operator elects to begin a hydroblasting operation, either lever 16 or lever 36 is depressed. In the embodiment shown in FIG. 4, it is more likely that lever 36 is depressed first since it is positioned against the operator's shoulder and, consequently, would be more likely used for an "on" or "off" mode with the throttling more accurately controlled through the depression of lever 16. Assuming that to be the case, lever 36 is depressed first resulting in the displacement of incompressible fluid volume $V_2$ into volume $V_3$ as shown in FIG. 2. Once this happens, the tip of piston 64 contacts head 230 of piston 226 as shown in FIG. 6. The operator may then begin to squeeze lever 16 gradually displacing piston 14. As the operator squeezes lever 16, a larger volume of incompressible fluid is introduced into volume $V_3$ eventually resulting in the position shown in FIG. 3 which would in turn seal off dump valve 200.

Figure 5:
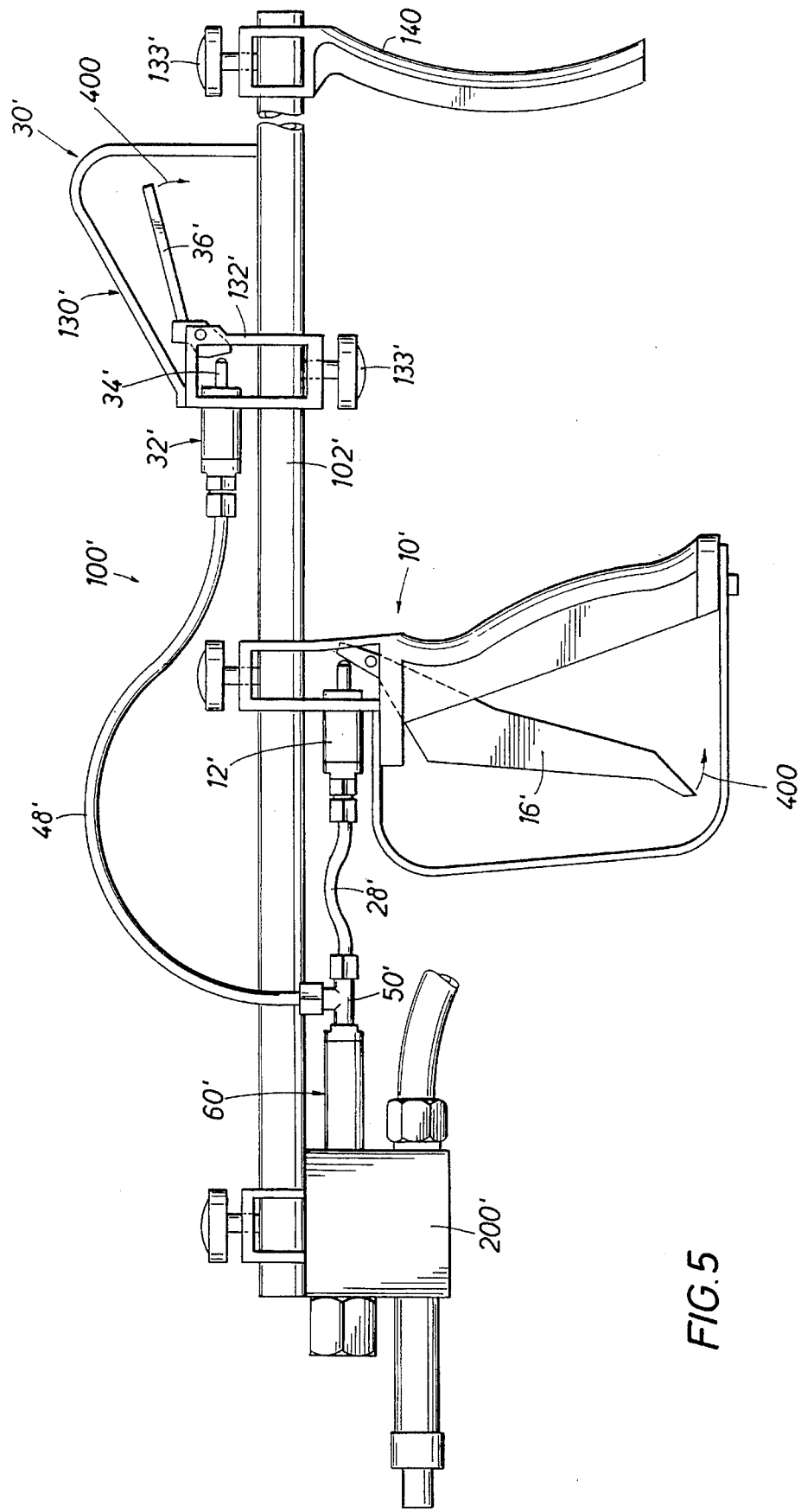
FIG. 5 is an another version of a hydroblasting gun according to the present invention.

An alternate embodiment for a hydroblasting gun embodying the present invention is shown in FIG. 5. This embodiment includes a conduit 48' connecting a housing 32' with a T-section 50' as in the preferred embodiment. Similarly, conduit 28' connects housing 12' with T-section 50'. An actuator 60' is connected to T-section 50' and interconnects with dump valve 200'. Other than the restructuring of the frame portion of second trigger 30', the remaining elements of this embodiments are identical in structure and operation to the preferred embodiment.

In the operation of the alternate embodiment, the operator may select to depress either lever 16' or lever 36' in the direction of arrows 400 to initiate operation. The operator may elect to depress both levers simultaneously which would gradually increase volume $V_3$ equivalent to the spontaneous displacement at any point in time equal to $V_1+V_2$. The operator may then use a combination of the displacement of lever 16' and 36' to effect the throttling operation as well.

Figure 7:
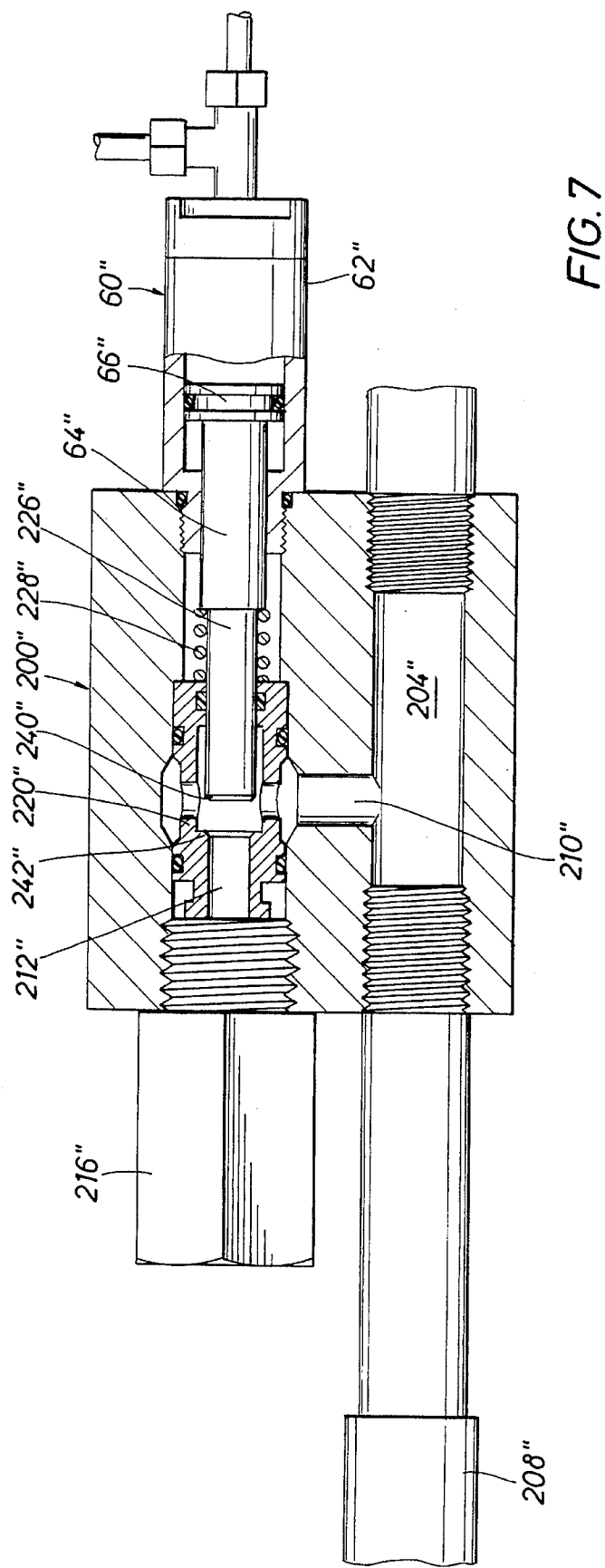
FIG. 7 is an alternate embodiment of a cross-section detail of a portion of the present invention.

Referring now to FIG. 7, an alternate embodiment of the dump valve as shown in FIG. 6 is depicted. This alternate embodiment of the dump valve in combination with an alternate embodiment of the actuator 60 could be used for either embodiment of a hydroblasting gun as shown in FIGS. 4 and 5. In this alternate embodiment of dump valve 200", actuator 60" still includes a housing 62" as disclosed above with respect to FIGS. 1–3. A piston 64" is supported within housing 62" but is an integral part of piston 226". In this alternate embodiment, piston 64" and piston 226" may be manufactured as a single unit. Spring 228" serves to bias piston 226"/64" to the right as shown in FIG. 7. Except for the manufacture of piston 226"/64" as a single unit, the remaining components of this alternate embodiment for dump valve 200" and actuator 60" are identical in structure and operation.

Referring still to FIG. 7, but in combination with FIGS. 1–3, actuation of a first trigger 10 would displace piston 226"/64", which would include a head 66", a volume $V_3$ equivalent to the displaced volume $V_1$ of first trigger 10. Such a first displacement would serve to compress spring 228" and displace piston 226"/64" to the left a portion of the total stroke distance as shown in FIG. 7. In this manner, a first actuation has been initiated but hydroblasting operations have not begun since water is still permitted to bypass nozzle 208 (see FIG. 6) through bores 210" and 212" and out muffler 216". As lever 36 of second trigger 30 is depressed and begins to displace ram 34 in the direction of arrow 41 as shown in FIG. 2, this displacement of volume from housing 32 is transferred to actuator 60" which further serves to displace piston 226"/64" to the left as shown in FIG. 7, further compressing spring 228" and beginning to advance beveled edge 240" towards corresponding beveled edge 242" of sleeve 220, thereby resulting in the throttling effect discussed above. Upon full displacement of lever 36, the end of piston 226"/64" is fully seated, sealing off dump valve 200" and permitting the full ejection of all water through bore 204" and out nozzle 208" of the hydroblasting gun. At this point, the hydroblasting gun is fully operational.

Obviously, modifications and alternations to the embodiments disclosed herein will be apparent to those skilled in the art in view of this disclosure. However, it is intended that all such variations and modifications fall within the spirit and scope of this invention as claimed.

What is claimed is:

1. A switch system comprising:
   a first actuatable trigger having a housing, a displacable ram supported therein, and a lever in spaced relationship to said ram, said ram being adapted to displace a predetermined first volume of fluid within said housing upon actuation of said lever;

a second actuatable trigger having a housing, a displacable ram supported therein, and a lever in spaced relationship with said ram, said ram of said second trigger being adapted to displace a predetermined second volume of fluid within said housing of said second trigger upon actuation of said lever of said second trigger; and an actuator having a housing and a piston supported within said housing, said actuator housing being in fluid communication with said displaced volumes of fluid of said first and second triggers, and said piston being adapted to be displaced within said housing of said actuator a predetermined third volume greater than said first volume or said second volume so that upon displacement of said piston by said predetermined third volume, a signal is initiated.

2. The switch system according to claim 1 wherein the diameter of said displacable ram of said first actuatable trigger and the diameter of said displacable ram of said second actuatable trigger are substantially equal.

3. The switch system according to claim 2 wherein said piston includes a head portion having a diameter greater than the diameter of said rams of said first and second actuatable triggers.

4. The switch system according to claim 2 wherein said piston includes a head portion having a diameter about twice the diameter of said rams of said first and second actuatable triggers.

5. A switch system comprising:

a first actuatable trigger having a housing, a displacable ram supported therein, and a lever in spaced relationship to said ram, said ram being adapted to displace a predetermined first volume of fluid within said housing upon actuation of said lever;

a second actuatable trigger having a housing, a displacable ram supported therein, and a lever in spaced relationship with said ram, said ram of said second trigger being adapted to displace a predetermined second volume of fluid within said housing of said second trigger upon actuation of said lever of said second trigger; and an actuator having a housing and a piston supported within said housing, said actuator housing being in fluid communication with said displaced volumes of fluid of said first and second triggers, and said piston being adapted to be displaced within said housing of said actuator a predetermined third volume substantially equal to said first volume and said second volume so that upon displacement of said piston by said predetermined third volume, a signal is initiated.

6. A hydroblasting spray gun comprising:

a base member;

a first actuatable trigger having:
an adjustable frame attached to said base,
a lever supported within said frame,
a housing supported within said frame, and
a displacable ram supported within said housing and in contact with said lever so that upon movement of said lever, said ram displaces a predetermined first volume of fluid within said housing;

a second actuatable trigger having:
an adjustable frame attached to said base,
a lever supported within said frame,
a housing supported within said frame, and
a displacable ram supported within said housing and in contact with said lever so that upon movement of said lever, said ram displaces a predetermined second volume of fluid within said housing;

an actuator having a housing and a piston supported within said housing, said housing being in fluid communication with said displaced volumes of fluid of said first and second triggers, and said piston being adapted to be displaced within said housing of said actuator a predetermined third volume greater than said first volume or said second volume; and a dump valve having a housing and a sealing piston biased to an open position supported within said housing of said dump valve, said actuator housing being attached to said dump valve housing so that said piston of said actuator contacts said sealing piston upon displacement of said piston of said actuator by said predetermined third volume and said piston of said actuator further displaces said sealing piston to a closed position enabling actuation of said gun.

7. The hydroblasting spray gun according to claim 6 wherein the diameter of said displacable ram of said first actuatable trigger and the diameter of said displacable ram of said second actuatable trigger are substantially equal.

8. The hydroblasting spray gun according to claim 7 wherein said piston of said actuator includes a head portion having a diameter greater than the diameter of said rams of said first and second actuatable triggers.

9. A hydroblasting spray gun comprising:

a base member;

a first actuatable trigger having:
an adjustable frame attached to said base,
a lever supported within said frame,
a housing supported within said frame, and
a displacable ram supported within said housing and in contact with said lever so that upon movement of said lever, said ram displaces a predetermined first volume of fluid within said housing;

a second actuatable trigger having:
an adjustable frame attached to said base,
a lever supported within said frame,
a housing supported within said frame, and
a displacable ram supported within said housing and in contact with said lever so that upon movement of said lever, said ram displaces a predetermined second volume of fluid within said housing;

an actuator having a housing and a piston supported within said housing, said housing being in fluid communication with said displaced volumes of fluid of said first and second triggers, and said piston being adapted to be displaced within said housing of said actuator a predetermined third volume substantially equal to said first volume and said second volume; and a dump valve having a housing and a sealing piston biased to an open position supported within said housing of said dump valve, said actuator housing being attached to said dump valve housing so that said piston of said actuator contacts said sealing piston and displaces said sealing position to a closed piston within said dump valve housing upon displacement of said piston of said actuator by said predetermined third volume thereby enabling actuation of said gun.

10. A hydroblasting spray gun comprising:

a base member;

a first actuatable trigger having:
   an adjustable frame attached to said base,
   a lever supported within said frame,
   a housing supported within said frame, and
   a displacable ram supported within said housing and in contact with said lever so that upon movement of said lever, said ram displaces a predetermined first volume of fluid within said housing;

a second actuatable trigger having:
   an adjustable frame attached to said base,
   a lever supported within said frame,
   a housing supported within said frame, and
   a displacable ram supported within said housing and in contact with said lever so that upon movement of said lever, said ram displaces a predetermined second volume of fluid within said housing;

an actuator having a housing and a piston supported within said housing, said housing being in fluid communication with said displaced volumes of fluid of said first and second triggers, and said piston being adapted to be displaced within said housing of said actuator a predetermined third volume greater than said first volume or said second volume; and a dump valve having a housing and a sealing piston biased to an open position supported within said housing of said dump valve and attached to said piston of said actuator so that upon displacement of said piston of said actuator by said predetermined third volume said sealing piston advances to a closed position enabling actuation of said gun.

11. The hydroblasting spray gun according to claim 10 wherein the diameter of said displacable ram of said first actuatable trigger and the diameter of said displacable ram of said second actuatable trigger are substantially equal.

12. The hydroblasting spray gun according to claim 11 wherein said piston of said actuator includes a head portion having a diameter greater than the diameter of said rams of said first and second actuatable triggers.

13. The hydroblasting spray gun according to claim 11 wherein said piston of said actuator includes a head portion having a diameter about twice the diameter of said rams of said first and second actuatable triggers.

14. A hydroblasting spray gun comprising:

a base member;

a first actuatable trigger having:
   an adjustable frame attached to said base,
   a lever supported within said frame,
   a housing supported within said frame, and
   a displacable ram supported within said housing and in contact with said lever so that upon movement of said lever, said ram displaces a predetermined first volume of fluid within said housing;

a second actuatable trigger having:
   an adjustable frame attached to said base,
   a lever supported within said frame,
   a housing supported within said frame, and
   a displacable ram supported within said housing and in contact with said lever so that upon movement of said lever, said ram displaces a predetermined second volume of fluid within said housing;

an actuator having a housing and a piston supported within said housing, said housing being in fluid communication with said displaced volumes of fluid of said first and second triggers, and said piston being adapted to be displaced within said housing of said actuator a predetermined third volume substantially equal to said first volume and said second volume; and a dump valve having a housing and a sealing piston biased to an open position supported within said housing of said dump valve and attached to said piston of said actuator so that upon displacement of said piston of said actuator by said predetermined third volume said sealing piston advances to a closed position enabling actuation of said gun.

* * * * *